Figure 1:
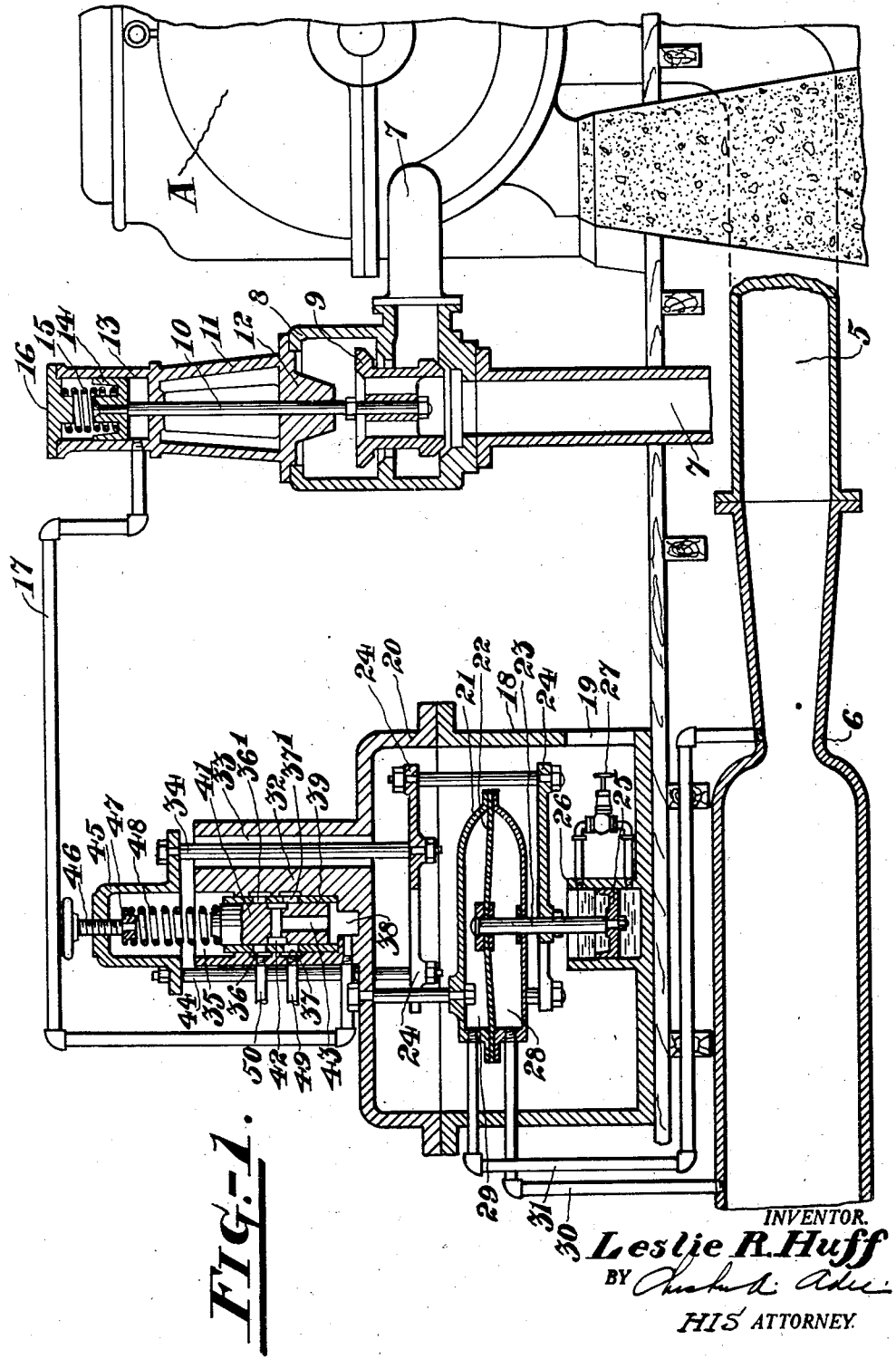

Aug. 29, 1933.  L. R. HUFF  1,924,930
AUTOMATIC REGULATOR FOR PUMPS
Filed April 25, 1930  2 Sheets-Sheet 2

INVENTOR.
Leslie R. Huff
BY
HIS ATTORNEY

Patented Aug. 29, 1933

1,924,930

UNITED STATES PATENT OFFICE 1,924,930

AUTOMATIC REGULATOR FOR PUMPS

Leslie R. Huff, Phillipsburg, N. J., assignor to Ingersoll-Rand Company, Jersey City, N. J., a corporation of New Jersey Application April 25, 1930. Serial No. 447,360

5 Claims. (Cl. 230—9)

This invention relates to automatic regulators, more particularly to an automatic throttle control for a turbo compressor or the like operated either by suction from the intake of the turbo blower or by pressure from the output.

In practice there are a number of variables in the operation of turbo compressors which affect one or more of the qualities of speed, pressure, or volume. Variation in steam pressure, variation of load and even atmospheric changes affect the operation of the apparatus.

It is usually important that either the volume or the pressure be kept as nearly constant as possible and to that end automatic regulators controlling the speed of the motor, which, of course, directly affects either of these qualities, are made part of the equipment of well designed turbo compressors. These regulators uniformly are connected to the steam inlet and govern the speed of the motor by control of the throttle.

Many of these devices have pronounced disadvantages in that their reactions to sudden changes of operating conditions is too abrupt and violent, tending to over-control, thus causing a pendulum action before reaching a condition of equilibrium. This pendulum action or hunting is often checked by the introduction of friction into the governing device, but often the introduction of such a countercheck is so complicated with levers, rods, links and the like that a serious amount of lost motion or play is involved, unless the parts are constructed with costly exactitude.

The object of my invention is to provide a control regulator at once compact, simple and easily adjusted, having a minimum of moving parts and actuated either by the pressure of air entering or leaving the regulated device.

By utilizing the design whereby the regulator is operated by the intake air a constant volume regulator is provided, and by operating the control by the output air a constant pressure regulator is had.

My invention, as will be more particularly set forth hereinafter, employs a diaphragm to increase or reduce the tension of a spring which affects the position of a plunger valve adapted to permit pressure to be exerted against a control piston connected to the throttle valve of the turbo compressor. The moving parts are relatively few, the motion of these parts is relatively little, and the complications inherent in many other types of regulator are avoided.

Figure 2:
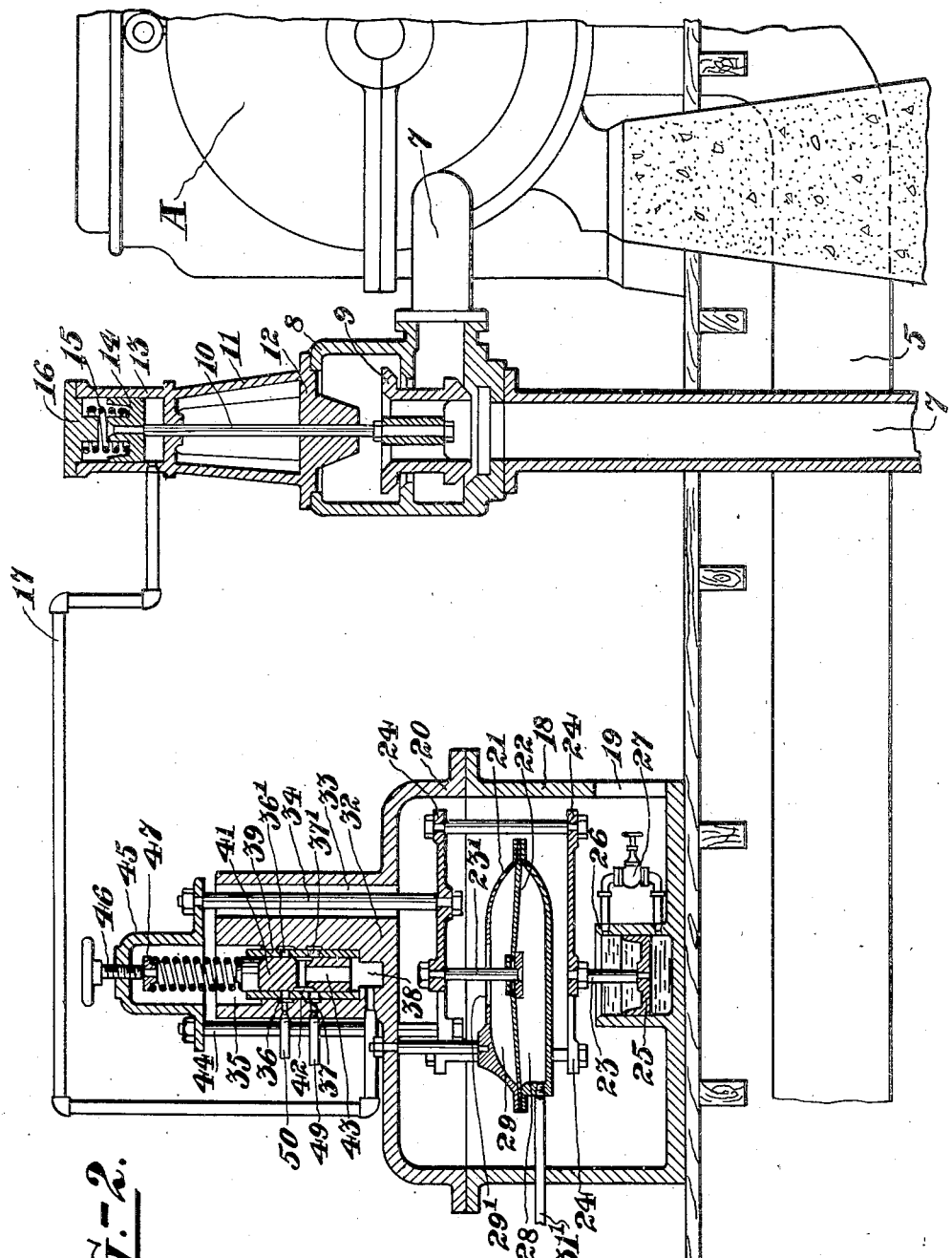

In the drawings in which similar reference characters refer to similar parts,

Figure 1 is a sectional view of my invention as applied to a conventional turbo compressor in which the reduced pressure at a venturi in the intake is used as a motivating force for the diaphragm, and Figure 2 is a sectional view of a similar installation in which the motive power for the diaphragm is taken from the output of the turbo blower.

Referring to the drawings the turbo compressor is represented generally by A. An intake pipe 5 which may have a venturi 6 affords a supply of air to be acted upon by the compressor. In a steam conduit 7 is a valve box 8 in which is placed a balanced throttle valve 9 to which is connected a rod 10.

Surmounting the valve box 8 is a support 11 having a base 12 which acts as a closure for the valve box. In the upper part of the support 11 is a cylinder 13. The rod 10 projects through a bore in the closure 12 and another in the base of the cylinder 13 and is connected to a piston 14. A spring 15 exerts pressure between the piston 14 and a plate 16 which forms a closure for the top of the cylinder 13 thereby urging the valve 9 to its seat. A tube 17 enters the cylinder 13 near its base.

This assembly constitutes the throttle valve and the throttle valve piston connection which directly controls the amount of steam permitted to enter the turbo blower.

A diaphragm housing 18 having a handhole 19 and a cover portion 20 is located conveniently to the throttle valve of the turbo blower. Supported in the diaphragm housing 18 is a diaphragm chest 21 in which a diaphragm 22 is connected by means of a rod 23 to a frame 24.

A plunger 25 in a dash pot 26 is connected in Figure 1 to the diaphragm by means of the rod 23 and in Figure 2 by means of a rod 23'. A dash pot control 27 is accessible through the handhole 19. The diaphragm chest 21 is divided by the diaphragm into two portions, a high pressure portion 28 and a low pressure portion 29. The expressions high and low are purely relative.

In Figure 1 the high pressure portion 28 is preferably connected by means of a tube 30 to the inlet pipe of the turbo blower at a point before the venturi 6 although it will be clear that a simple opening to atmosphere would be operative. The low pressure portion 29 is connected by a tube 31 to the inlet pipe of the turbo blower at a point immediately after the venturi 6. In Figure 2 the low pressure portion 29 is open to atmosphere through a hole 29' and the high pressure portion is connected by means of a tube 31' to the output of the turbo compressor (not shown).

The diaphragm housing cover 20 carries a cylinder block 32. A bore 33 through the cylinder block 32 affords passage to a rod 34 which is part of the frame 24. Another bore 35 is formed in the cylinder block 32. In the bore 35 are formed annular recesses 36 and 37 and at its closed end is an oil pocket 38 into which the tube 17 leads. A sleeve or cylinder liner 39 having ports 36' and 37' registrable with the annular recesses 36 and 37 is fitted in the bore 35. A plunger or valve 41 is slidably disposed inside the sleeve 39. An annular groove 42 in the plunger is registrable with the ports 36' and 37' in the sleeve 39. The groove 42 is connected to the oil pocket 38 by a T-shaped passage 43.

Supported on the rod 34 and a rod 44 both of which are parts of the frame 24 is a bell-shaped cap 45 in which is threaded an adjusting member 46. Interposed between the plunger 41 and a head 47 on the adjusting member 46 is a spring 48. This spring is adjusted to balance the valve 41 at the desired volume or pressure of the turbo compressor. The valve 41 so balanced is in neutral position but a variation of volume or pressure will serve to unbalance it and bring it into action.

Leading into the annular recess 37 is a tube 49 through which pressure oil is forced. This may be made part of the general lubricating system of the installation and does not require a separate oil pump. A tube 50 is connected with the annular recess 36 for the purpose of draining oil therefrom. The annular groove 42 in the plunger 41 is registrable through the ports 36' and 37' with the annular recesses 36 and 37 as the plunger 41 moves up or down in the cylinder liner 39.

Assuming the use of the suction system of volume control illustrated in Figure 1 the operation of this control follows. Steam is admitted to the turbo blower through the inlet 7, the valve 9 being opened initially in any convenient manner. Air is sucked through the intake pipe 5. Varying pressure, slightly less than atmospheric, is maintained in section 28 of the diaphragm chest 21.

In accordance with a well known principle the velocity of the intake air is increased by the venturi 6 with a consequent drop in the pressure at that point. This pressure drop is communicated to section 29 of the diaphragm chest through the connection 31 with the result that the higher pressure on the lower side of the diaphragm forces it upward.

The movement of the diaphragm is retarded by the braking action of the dash pot 26. The frame 24 is lifted, carrying with it the cap 45 and releasing tension on the spring 48, unbalancing the valve 41. The plunger 41 is forced upward by the pressure of oil in the pocket 38, the tube 17 and the cylinder 13. When it is lifted sufficiently to bring the annular groove 42 in registration with the annular recess 36 by means of the ports 36' in the cylinder liner, the pressure oil drains off through the tube 50.

Entrance of fresh pressure oil is cut off by the movement of the plunger 41 which closes the ports 37' leading to the pressure line. Consequently the pressure on the oil in the governing system drops and the spring 15 forces the piston 14 downward in the cylinder 13 to close the throttle valve 9. As the throttle valve closes the speed of the turbo compressor drops, causing the velocity of the air in the air intake to drop, and thereby decreasing the suction in the chamber 29 of the diaphragm chest 21. The diaphragm 22 assumes a more nearly neutral position, and the frame 24 drops, thereby increasing the tension on the spring 48 and forcing the plunger 41 down into the cylinder liner 39 cutting off drainage of oil through the passage 50. Registration of the pressure oil inlet 49 with the annular groove 42 is established thus restoring pressure to the face of the piston 14 and reopening the throttle valve 9. When sufficient pressure fluid has been admitted to lift the throttle valve the pressure will reach a point where it will balance the spring 48 and will force the valve 41 to its neutral position.

It will be clear to those skilled in the art that by adjusting the speed of reaction by means of the dash pot control and adjusting the tension on the spring 48 that a very delicate adjustment of the speed of the turbo compressor may be attained.

It should be pointed out in this connection that the annular groove 42 in the plunger 41 should be almost as wide as the distance between the ports 36' and 37' in the cylinder liner 39 so that a very slight motion of the plunger 41 may cut off the influx of pressure oil and open the oil drainage connection or shut off the outflow and open the inflow. By so constructing the regulator violent and sudden changes of speed are avoided and the regulation may be made so sensitive and gentle as to maintain practically constant volume or pressure.

It will be seen that in using that adaptation of my invention illustrated in Figure 2 pressure instead of suction is employed to perform the same functions in the same way. In view of the description of the operation of the structure shown in Figure 1 the use of the alternate form should be clear to those skilled in the art.

I claim:

1. In combination with a turbo compressor and the like, an air intake passage, a steam supply pipe having a throttle valve therein, means constantly urging the valve to its seat, a pressure actuated piston connected to the throttle valve, a diaphragm adapted to respond to differential pressures created by the operation of the turbo compressor, a pressure fluid supply passage to the throttle valve piston, a chamber in the pressure fluid passage, a spring pressed valve in the chamber to regulate the flow of pressure fluid to or from the throttle valve piston, means to adjust the spring pressed valve to balance it in neutral position during normal desired operation of the turbo compressor, and a connection to convey movements of the diaphragm to said means to unbalance the valve and thereby vary the pressure on the throttle valve piston.

2. In combination with a turbo compressor and the like, an air intake passage, a steam supply pipe having a throttle valve therein, means constantly urging the valve to its seat, a pressure actuated piston connected to the throttle valve, a diaphragm adapted to respond to differential pressures created by the operation of the turbo compressor, a pressure fluid supply passage to the throttle valve piston, a chamber in the pressure fluid passage, a spring pressed valve in the chamber to regulate the flow of pressure fluid to or from the throttle valve piston, means to adjust the spring pressed valve to balance it in neutral position during normal desired operation of the turbo compressor, a connection to convey movements of the diaphragm to said means to unbalance the valve and thereby vary the pressure on the throttle valve piston and retarding means connected to the diaphragm to oppose the movements thereof.

3. In combination with a turbo compressor and the like, a steam supply pipe to the turbine having a throttle valve therein, a pressure actuated piston connected to the throttle valve, means associated with the piston constantly urging the throttle valve to its seat, a diaphragm adapted to respond to differential pressures created by the operation of the turbo compressor, a pressure fluid passage to conduct pressure fluid to and from the throttle valve piston, a chamber in the pressure fluid passage, a drainage passage from the chamber, a valve in the chamber adapted to regulate the flow of pressure fluid to and from the throttle valve piston and being actuated in one direction by the pressure fluid, a spring to actuate the valve in the opposite direction, and means movable with the diaphragm and connected directly thereto for varying the force of the spring.

4. In combination with a turbo compressor and the like, a steam supply pipe to the turbine having a throttle valve therein, a pressure actuated piston connected to the throttle valve, means constantly urging the throttle valve to its seat, a diaphragm responsive to differential pressures created by the operation of the turbo compressor, a pressure fluid passage to conduct pressure fluid to and from the throttle valve piston, a chamber in the pressure fluid passage, a drainage passage from the chamber, a normally balanced valve in the chamber adapted to regulate the flow of pressure fluid to or from the throttle valve piston and being actuated in one direction by the pressure fluid, a spring to actuate the valve in the opposite direction, and a spring seat connected to rise and fall with the diaphragm for varying the force of the spring.

5. In combination with a turbo compressor and the like, a steam supply pipe to the turbine having a throttle valve therein, means constantly urging the throttle valve to its seat, a pressure actuated piston connected to the throttle valve, a diaphragm responsive to differential pressures created by the operation of the turbo compressor, a pressure fluid passage to conduct pressure fluid to and from the throttle valve piston, a chamber in the pressure fluid passage, a drainage passage from the chamber, a valve in the chamber to regulate the flow of pressure fluid to or from the throttle valve piston and being actuated in one direction by the pressure fluid, a spring to actuate the valve in the opposite direction, a frame affixed to the diaphragm to move therewith, and means carried by the frame and acting against the spring for varying the force of the spring.

LESLIE R. HUFF.